United States Patent
Kamiyama et al.

(10) Patent No.: US 8,360,108 B2
(45) Date of Patent: Jan. 29, 2013

(54) METHOD FOR REHABILITATING EXISTING PIPES, AND REHABILITATION PIPE SEGMENT USED IN THE REHABILITATING METHOD

(75) Inventors: Takao Kamiyama, Hiratsuka (JP); Koji Kaneta, Hiratsuka (JP); Kenji Fujii, Hiratsuka (JP)

(73) Assignee: Shonan Gosei-Jushi Seisakusho K.K. (JP)

( * ) Notice: Subject to any disclaimer, the term of this patent is extended or adjusted under 35 U.S.C. 154(b) by 510 days.

(21) Appl. No.: 12/592,865

(22) Filed: Dec. 3, 2009

(65) Prior Publication Data

US 2010/0139799 A1 Jun. 10, 2010

(30) Foreign Application Priority Data

Dec. 4, 2008 (JP) ................................. 2008-309265
Jul. 3, 2009 (JP) ................................. 2009-158311

(51) Int. Cl.
*F16L 55/16* (2006.01)
(52) U.S. Cl. ......... 138/98; 138/97; 138/155; 405/150.1; 405/184.2; 264/269; 156/287
(58) Field of Classification Search ............. 138/98, 138/97, 155, 174; 405/150.1, 150.2, 151–153, 405/184.2; 264/269, 267; 156/287, 94, 95
See application file for complete search history.

(56) References Cited

U.S. PATENT DOCUMENTS

| | | | | |
|---|---|---|---|---|
| 4,767,236 A | * | 8/1988 | Rice | 405/184.3 |
| 4,768,562 A | * | 9/1988 | Strand | 138/98 |
| 5,101,863 A | * | 4/1992 | Fujii et al. | 138/98 |
| 5,380,128 A | * | 1/1995 | Fears | 405/157 |
| 5,454,401 A | * | 10/1995 | Kamiyama et al. | 138/98 |
| 5,598,873 A | * | 2/1997 | Kamiyama et al. | 138/98 |
| 5,794,662 A | * | 8/1998 | St. Onge et al. | 138/97 |
| 7,028,716 B2 | * | 4/2006 | Kaneta et al. | 138/98 |
| 7,156,124 B2 | * | 1/2007 | Kamiyama et al. | 138/98 |
| 7,165,578 B2 | * | 1/2007 | Kamiyama et al. | 138/98 |
| 7,311,121 B2 | * | 12/2007 | Kamiyama et al. | 138/98 |
| 2005/0252565 A1 | * | 11/2005 | Kamiyama et al. | 138/98 |

* cited by examiner

*Primary Examiner* — Patrick F Brinson
(74) *Attorney, Agent, or Firm* — Adams & Wilks

(57) ABSTRACT

An existing-pipe rehabilitation method for constructing a rehabilitation pipe inside an existing pipe to rehabilitate the existing pipe. A rehabilitation pipe is constructed inside an existing pipe by coupling segments in the circumferential direction and the lengthwise direction of the existing pipe so that the rehabilitation pipe has a constant outer diameter. A lining material impregnated with a liquid curable resin is inserted into the rehabilitation pipe thus constructed. The liquid curable resin is cured to line the internal circumferential surface of the rehabilitation pipe with the lining material so that an inner diameter of the rehabilitation pipe lined with the lining material is smaller than an inner diameter of the existing pipe.

18 Claims, 17 Drawing Sheets

METHOD FOR REHABILITATING EXISTING PIPES, AND REHABILITATION PIPE SEGMENT USED IN THE REHABILITATING METHOD

BACKGROUND OF THE INVENTION

1. Field of the Invention

The present invention relates to a method for rehabilitating existing pipes such as clean water and sewage pipes, agricultural water pipes, power pipes, communication pipes and the like, and to a rehabilitation pipe segment or a box culvert rehabilitating segment used in the method.

2. Description of the Related Art

There are pipe-lining methods for lining the internal circumferential surface of a pipe to repair the pipe without digging the pipe from the ground in the case that clean water and sewer pipes or other pipes buried underground have aged. These methods employ a pipe-lining material comprised of a flexible tubular resin-absorbing material that is impregnated with a curable resin and covered with a highly airtight film on the exterior thereof.

The pipe-lining material is everted and inserted into the pipe by hydrostatic pressure. The pipe-lining material is heated while being pressed against the internal circumferential surface of the pipe to be repaired, and the curable resin impregnated in the pipe-lining material is cured to thereby line the internal circumferential surface of the pipe (Japanese Laid-open Patent Application 2003-165158).

In order to rehabilitate an existing pipe having a large diameter, Japanese Laid-open Patent Application Nos. 2003-214098 and 2005-299711 disclose a pipeline rehabilitation method using segments that are sequentially coupled in the circumferential direction and the lengthwise direction of an existing pipe and assembled as a rehabilitation pipe. The gap between the external surface of the rehabilitation pipe and the inner wall surface of the existing pipe is filled with a grout material or another filling material that is cured to construct a composite pipe.

Segments used to assemble the rehabilitation pipe are formed as integrally molded plastic panel blocks partitioned by an inner surface plate, two side plates, and two end plates. Ribs and reinforcement plates are suitably provided to increase the strength of the segment.

With conventional pipe rehabilitation or box culvert rehabilitation in which a lining material impregnated with a thermosetting resin is used, the lining material must be made thick and a large amount of resin is required when an attempt is made to provide the rehabilitation pipe with strength. Therefore, a large amount of ice, cooling water, or another cooling medium is required to prevent the resin from setting during transport of the lining material. As a result, there is a problem in that costs are increased and construction work is difficult.

When assembled as a rehabilitation pipe or rehabilitation structure, a rehabilitation pipe or a box culvert and other laid conduits has its external circumferential surface exposed to the existing pipe. Even when a grout material or another filling material is filled between the existing pipe and the rehabilitation pipe or the rehabilitation structure, there is a problem in that the filling material is directly impacted from the exterior in the case that the existing pipe or the like is damaged, or damage to the rehabilitation pipe or the like is increased because the strength of the filling material is low. With a rehabilitation pipe in which segments are used, there is little internal skeletal structure in the circumferential direction, and deformation readily occurs under external force, water hammering, or other internal pressure. Furthermore, a segment formed in the shape of an integrally molded plastic block as described in the prior art must be modified in plate thickness in order to increase the strength of the segment, and costs are considerably increased when a mold is fabricated for resin molding.

In either case, a conventional rehabilitation pipe may be suitable for repairing an existing pipe, but the strength of such a rehabilitation pipe is insufficient as a self-supporting pipe because there are cases in which the pipe is damaged or broken when the pipe receives a large impact from the exterior or the interior thereof.

An object of the present invention is to solve such problems and to provide a method for rehabilitating an existing pipe using a lining material and segments so as to strengthen the existing pipe and construct a self-supporting pipe, and to provide a segment used in the method for rehabilitating an existing pipe or a box culvert.

SUMMARY OF THE INVENTION

The present invention provides an existing-pipe rehabilitation method for constructing a rehabilitation pipe inside an existing pipe to rehabilitate the existing pipe, comprising: constructing, inside an existing pipe, a rehabilitation pipe obtained by coupling segments in the circumferential direction and the lengthwise direction of the existing pipe; and inserting a lining material impregnated with a liquid curable resin into the rehabilitation pipe thus constructed, and curing the curable resin to line the internal circumferential surface of the rehabilitation pipe with the lining material.

The present invention also provides an existing-pipe rehabilitation method for constructing a rehabilitation pipe inside an existing pipe to rehabilitate the existing pipe, comprising: inserting a lining material impregnated with a liquid curable resin into an existing pipe, and curing the curable resin to line the internal circumferential surface of the existing pipe with the lining material; and constructing, inside the existing pipe lined with the lining material, a rehabilitation pipe obtained by coupling segments in the circumferential direction and the lengthwise direction of the existing pipe.

In the present invention, a rehabilitation pipe having two layers of different material, i.e., a rehabilitation pipe composed of segments and a rehabilitation pipe composed of a lining material, is installed inside an existing pipe, and a composite pipe in which the existing pipe and the bilayer rehabilitation pipe are integrated can be constructed. Therefore, a self-supporting pipe can be constructed with dramatically improved strength that will incur little damage or breaking even when an earthquake occurs or another large impact is applied.

Preferably, concavities for producing gaps between adjacent segments are formed in the segments. The adjacent segments are bonded together with the curable resin in the lining material that has flowed into the gaps when the internal circumferential surface of the rehabilitation pipe is lined with a lining material. Therefore, a strong composite pipe can be obtained because the internal circumferential surface of the rehabilitation pipe is lined, mutually adjacent segments are bonded together, and the segments are firmly coupled together and integrated.

Further features of the invention, its nature and various advantages will be more apparent from the accompanying drawings and following detailed description of the invention.

BRIEF DESCRIPTION OF THE DRAWINGS

FIG. 12b is a cross-sectional view along line A-A of FIG. 12a;

DETAILED DESCRIPTION OF THE PREFERRED EMBODIMENTS

The present invention will now be described in detail with reference to the embodiments shown in the attached drawings. An existing pipe will be described that is configured as a circular pipe, but the present invention can naturally be applied to existing pipes that are rectangular or otherwise noncircular in a cross section orthogonal to the lengthwise direction of the pipe. The present invention can also be applied not only to shapes in which the cross-sectional shape is closed as a pipe, but also to, e.g., horseshoe shapes, semicircular shapes, concave shapes, and other shapes with an open side that may be considered to be pipes. Existing pipes that may be rehabilitated by the present invention include sewage pipes, fresh water pipes, and other channels buried in the ground; agricultural water pipes, manholes, electrical power pipes, communication pipes, box culverts, and other structures; as well as aboveground tunnels and various other structures.

Figure 1A:
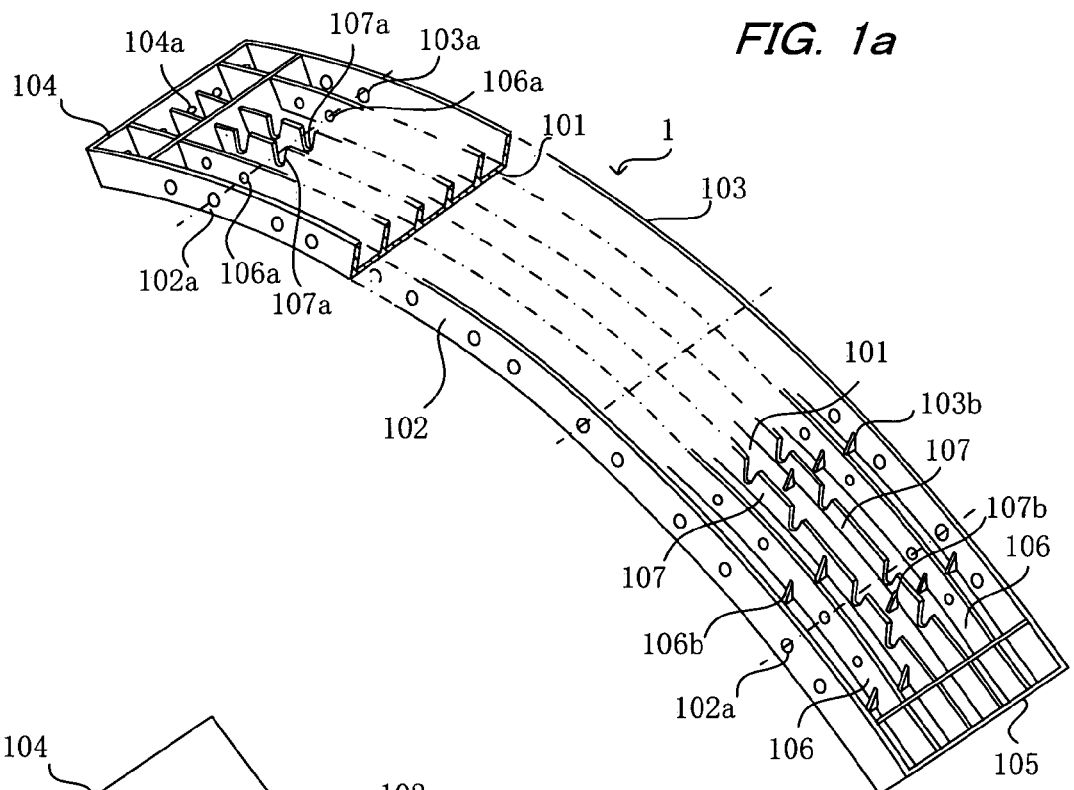
FIG. 1a is a perspective view showing the structure of a segment used in the present invention.
Figure 1B:
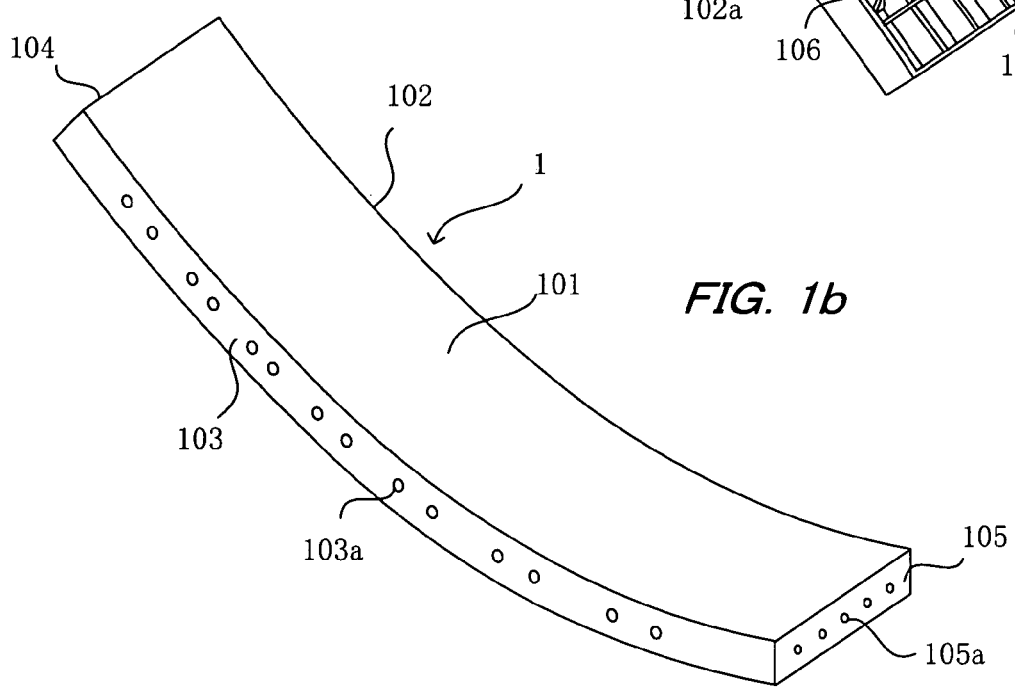
FIG. 1b is a perspective view of a segment as viewed from the rear.

FIGS. 1a and 1b show a segment 1 constituting an assembly unit of a rehabilitation pipe for rehabilitating an existing pipe. The segment 1 is a plastic block-shaped member integrally molded using a plastic material composed of an inner surface plate 101 constituting the internal circumferential surface of the rehabilitation pipe; side plates 102, 103 erectly disposed in perpendicular fashion along the edges on the two sides extending in the circumferential direction of the inner surface plate 101; and end plates 104, 105 erectly disposed in perpendicular fashion along the edges on the two sides extending in the pipe lengthwise direction of the inner surface plate 101. The side plates 102, 103 and the end plates 104, 105 of the segment 1 form outer-wall plates that surround the periphery of the inner surface plate 101 on four sides at the same height. The segment has a shape curved in an arc of a predetermined angle obtained by dividing the circumference into a plurality of equal parts, e.g., an angle of 72° obtained by dividing the circumference into five parts. However, the shape is not limited to an arcuate or fan shape, and may be a rectangular parallelepiped or a shape obtained by bending the segment into a square with rounded angles in accordance with the cross-sectional shape of the existing pipe, the size of the existing pipe, or the repair location of the existing pipe.

A plurality of inner plates (reinforcement plates) 106, 107 similar to the side plates is disposed parallel to the side plates 102, 103 inward therefrom and perpendicular to the upper surface of the inner surface plate 101 in order to reinforce the mechanical strength of the segment 1. Laterally protruding convex plates 103b, 106b, 107b are formed in a plurality of locations on the inner surface of the side plates 102, 103 and the two surfaces of the inner plates 106, 107 in order to prevent deformation of the plates. This provides a rib structure to increase the strength of the segment 1.

A plurality of through-holes 102a, 103a for inserting bolts, screws, or other members for coupling the segments in the lengthwise direction of the pipe is formed in the circumferential direction. A plurality of through-holes 106a for inserting the coupling member is formed in the inner plate 106 as well. The diameter of the through-holes 106a is less than the diameter of the through-holes 102a, 103a. A plurality of notches 107a is formed in the inner plate 107. A plurality of holes 104a, 105a through which bolts are passed is formed in the end plates 104, 105 in order to couple the segments 1 together in the circumferential direction of the segment.

The inner surface plate 101, the side plates 102, 103, the end plates 104, 105, the inner plates 106, 107, and the convex plates are all made of the same transparent, semitransparent, or opaque plastic, and are integrally formed using known molding techniques.

The outer surface of the end plates 104, 105 of the segments 1 are brought into close contact, and bolts 6 (FIG. 3) are inserted via the through-holes 104a, 105a and threaded with nuts (not shown) to fasten and couple the end plates 104, 105 in the circumferential direction.

Figure 2:
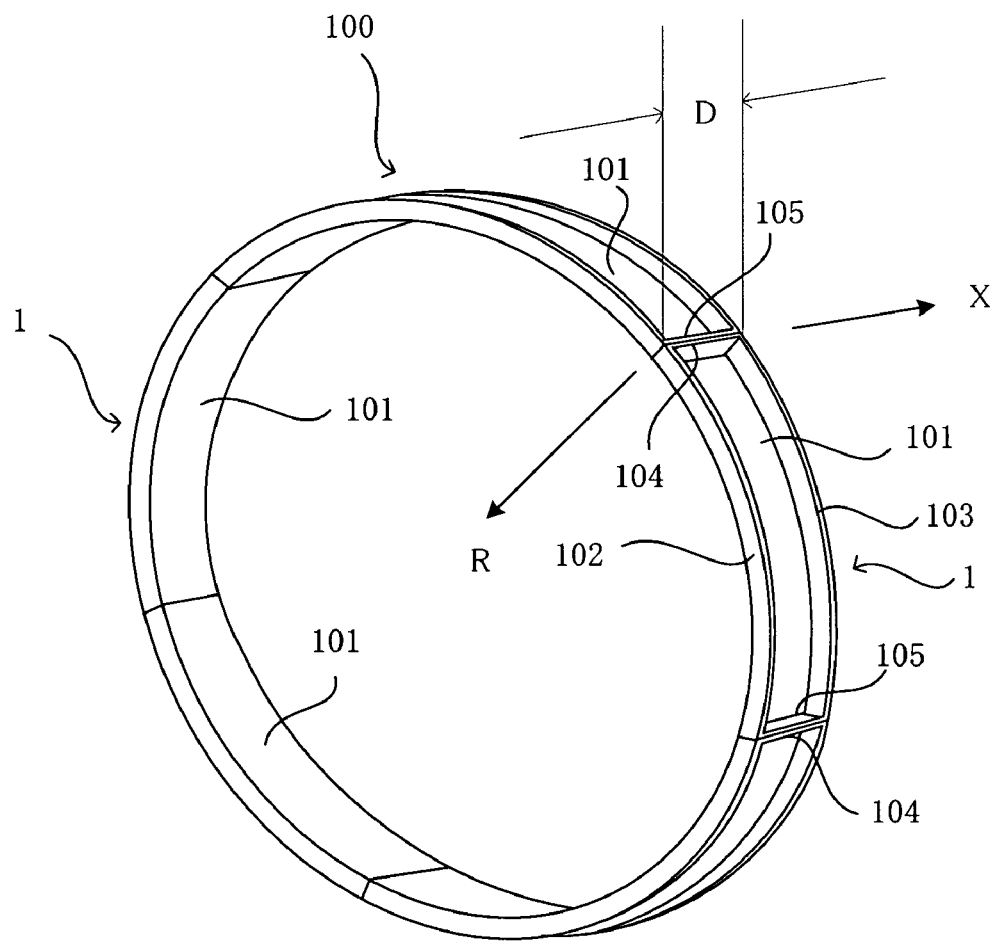
FIG. 2 is a perspective view showing the external appearance of a pipe unit obtained by coupling segments in the circumferential direction.

The segments 1 are coupled in the circumferential direction so that the internal circumferential surface of the inner surface plates 101 form a uniform surface and so that the outer surfaces of the side plates 102, 103 constitute the same surface. Therefore, when the segments 1 are sequentially coupled in the circumferential direction, a pipe element 100 (hereinafter referred to as pipe unit) having a predetermined short length can be assembled in a closed ring shape, as shown in FIG. 2. The pipe unit 100 forms a shape that is obtained when a circular pipe is perpendicularly cut into rings having a predetermined width D in the lengthwise direction X of the pipe. The outside diameter of the pipe unit 100 is less than the inside diameter of the pipe to be rehabilitated. The segment 1 corresponds to a member obtained when the pipe unit 100 is cut in the diametral direction R and divided (preferably equally divided) into a plurality of units in the circumferential direction.

FIG. 2 shows the inner surface plate 101, the side plates 102, 103, and the end plates 104, 105, which are the main constituent elements of the segment 1; and the inner plates 106, 107, the convex plates, and the other reinforcement structures are omitted from the drawing in order to avoid complexity. In this specification, the lengthwise direction of the pipe refers to the direction indicated by the arrow X extending in the longitudinal direction of the pipe unit 100; the radial direction refers to the direction indicated by the radial arrow R facing the center axis of the pipe unit 100; and the circumferential direction refers to the circumferential direction of the circle of the pipe unit 100.

Figure 3:
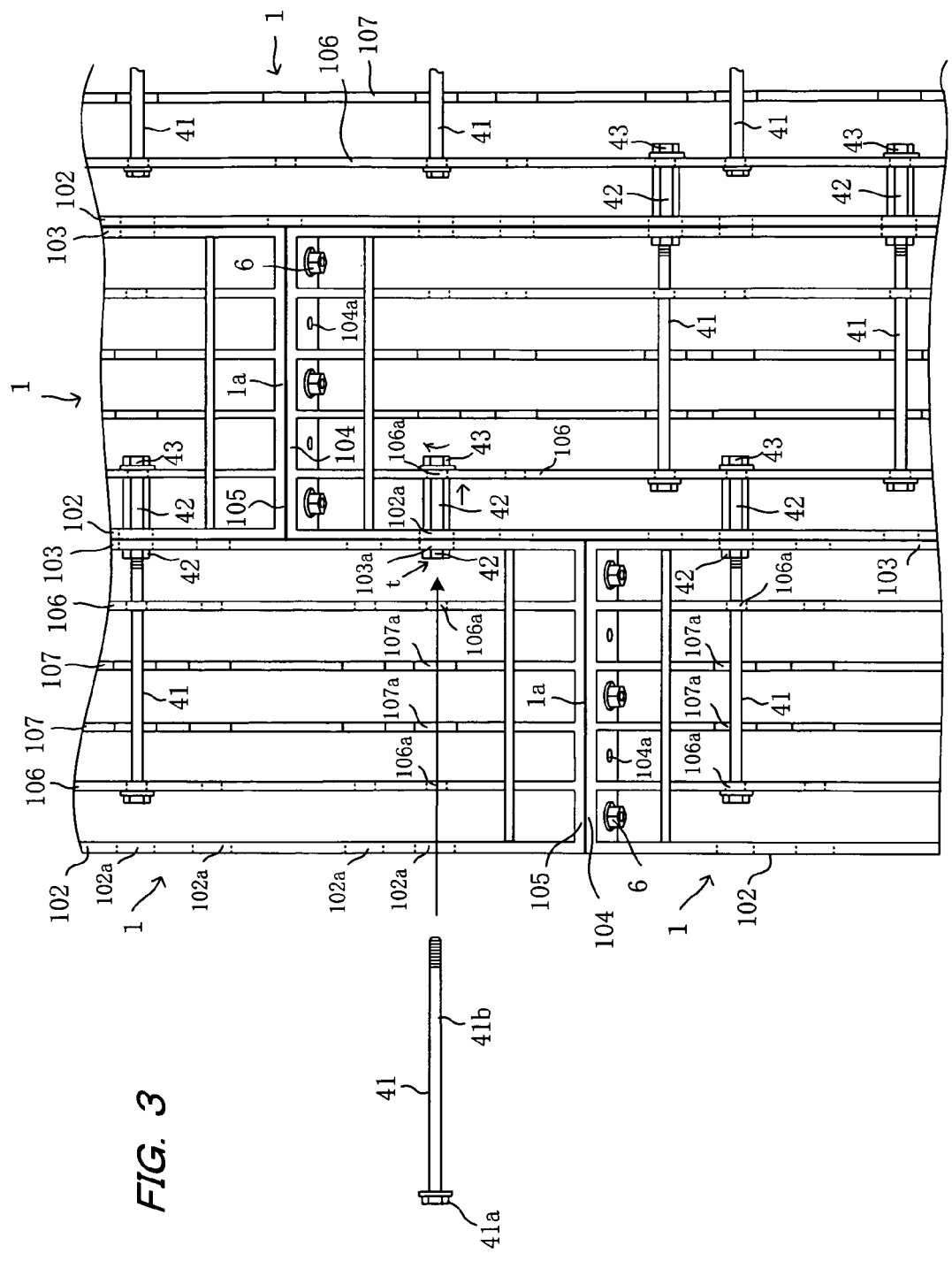
FIG. 3 is a top view showing segments coupled in the lengthwise direction of the pipe.

FIG. 3 shows a state in which the segments 1 or the pipe units 100 are coupled in the lengthwise direction of the pipe using a plurality of nuts and long bolts per segment.

Nuts 42 have a size that allows the nuts to pass through the holes 102a, 103a of the side plates 102, 103, but prevents the nuts from passing through the holes 106a of the inner plates 106. The long bolts 41 have bolt heads 41a that can pass through the holes 102a, 103a of the side plates 102, 103, but cannot pass through the holes 106a of the inner plates 106, and have bolt cores 41b that can pass through the holes 102a, 103a of the side plates 102, 103, the holes 106a of the inner plates 106, and the notches 107a of the inner plates 107.

To couple the segments in the lengthwise direction of the pipe, the nuts 42 are first secured to the segments 1. The securing action is carried out by inserting the nuts 42 into the holes 102a of the side plate 102 and bringing the nuts into contact with the inner plates 106, threading the bolts 43 from the opposite side into the nuts 42, and then securing the nuts 42 to the inner plates 106 of the segments 1. At this point, the nuts 42 protrude from the side plate 102, and the protruding distance of the nuts is greater than the thickness of the side plate 103 of another segment to be coupled, as shown by the reference symbol t in FIG. 3. The nuts 42 can be secured to the segments 1 after the segments 1 have been coupled in the circumferential direction as shown in FIG. 2, or be secured to the segments 1 first, after which the segments are coupled in the circumferential direction.

Next, the first segment 1 to which the nuts 42 have been secured, and another segment 1 to which the first segment is to be coupled are brought together so that the internal circumferential surfaces of the inner surface plates 101 form a uniform surface, and the side plates 102, 103 of the two segments 1 are brought into close contact by inserting the nuts 42 protruding from the holes 102a of the side plate 102 into the holes 103a of the side plate 103 of the other segment 1. In this state, the long bolts 41 are passed through the holes 102a of the side plate 102, the holes 106a of the inner plates 106, and the notches 107a of the inner plates 107 of another segment 1 and threaded into the nuts 42, as indicated by the arrow in FIG. 3, until the two segments 1, 1 are fastened together in the lengthwise direction of the pipe.

The connection of the pipe units or the segments in the lengthwise direction of the pipe may also be carried out using various methods other than that shown in FIG. 3, e.g., using a coupling member such as that disclosed in Japanese Laid-open Patent Application No. 2005-299711.

Figure 4:
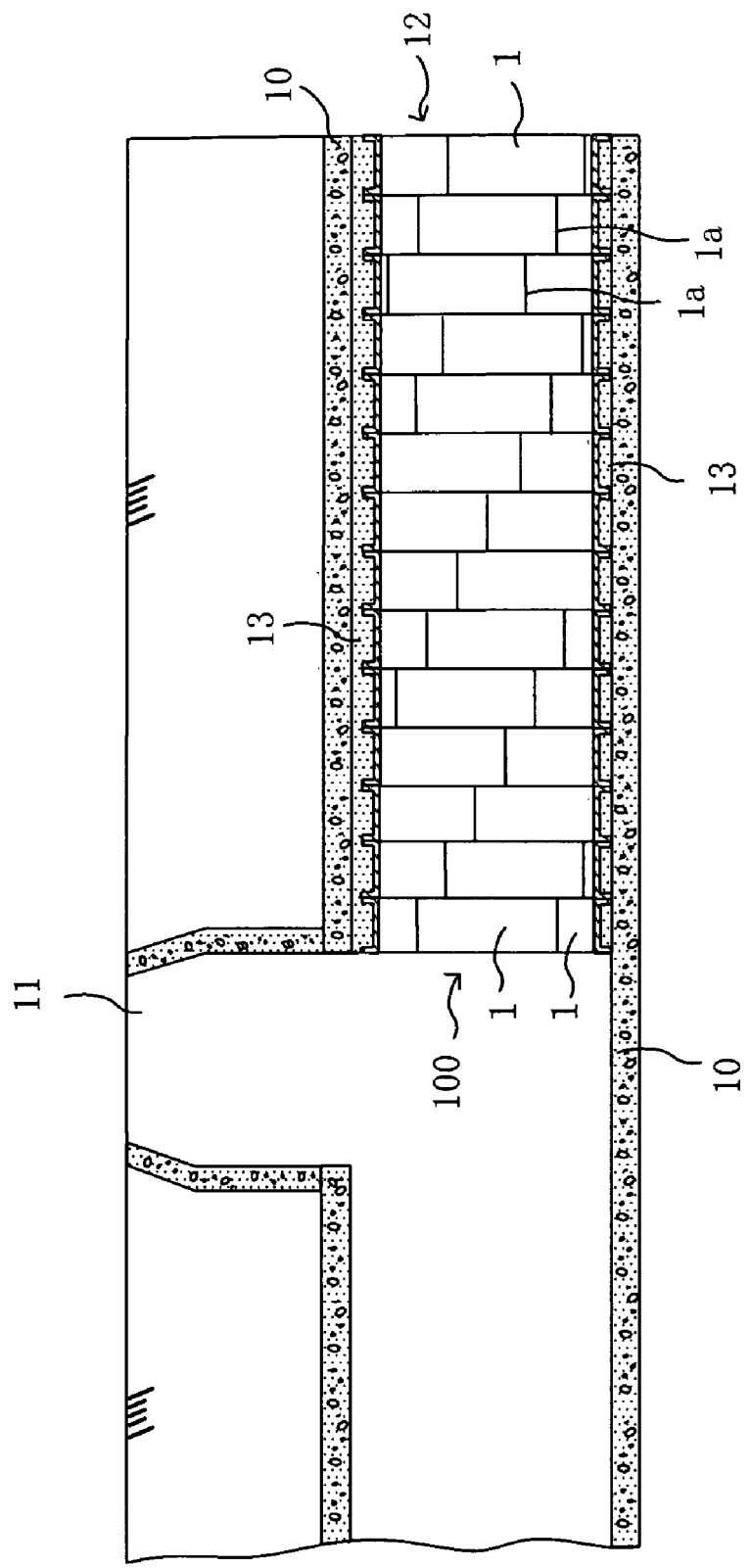
FIG. 4 is a cross-sectional view of an existing pipe when a rehabilitation pipe is laid using segments inside the existing pipe.

FIG. 4 shows a rehabilitation pipe 12 composed of segments 1 laid inside an existing pipe 10. The segments 1 are transported into a manhole 11, sequentially coupled in the circumferential direction to assemble a pipe unit 100, which is then carried into the existing pipe 10. The segments 1 of the pipe unit 100 are coupled in the lengthwise direction of the pipe to the segments 1 of another pipe unit 100 using the method shown in FIG. 3 or using another known method. The pipe units 100 are coupled so that adjacent parts 1a in the circumferential direction of the segments 1 of the pipe units 100 are mutually offset, as shown in FIGS. 3 and 4. Such an arrangement allows the strength of the rehabilitation pipe of segments to be increased.

Figure 5:
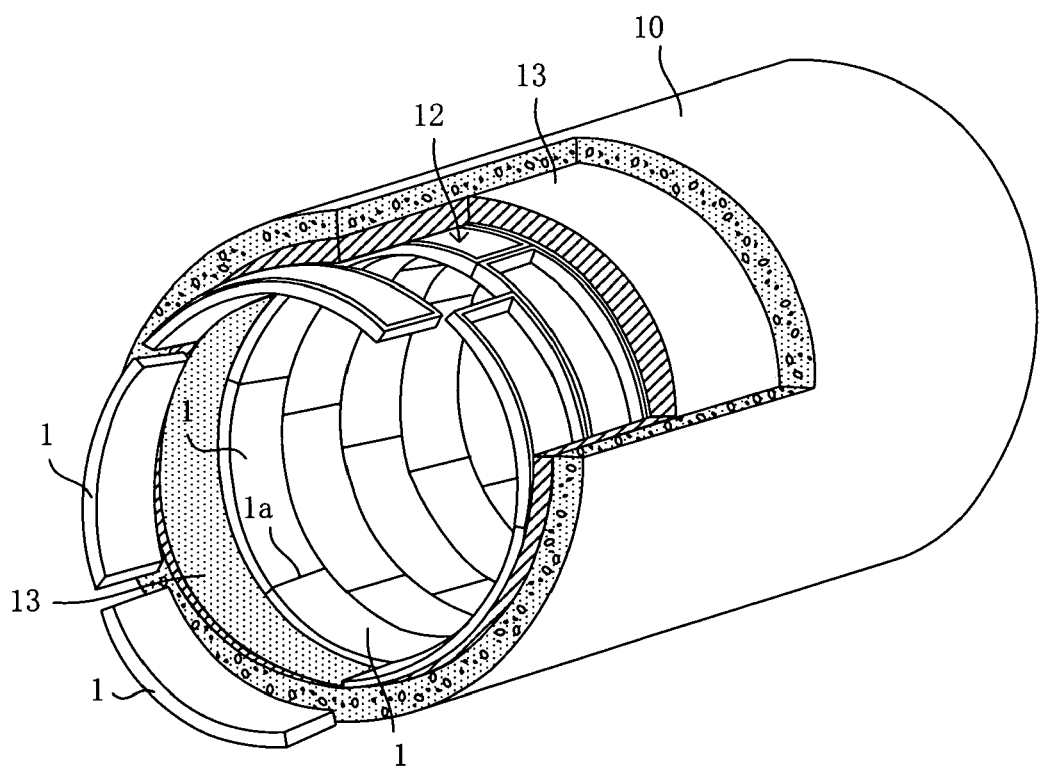
FIG. 5 is a perspective view showing a rehabilitation pipe assembled inside an existing pipe using segments.

As described above, a rehabilitation pipe 12 having a uniform internal circumferential surface can be constructed inside an existing pipe 10 by sequentially coupling the pipe units 100 in the lengthwise direction of the pipe. FIG. 5 shows a perspective view of the laid rehabilitation pipe 12. The rehabilitation pipe 12 is integrated with the existing pipe 10 with sufficient strength because a filling material 13 composed of grout material is injected into the gap between the rehabilitation pipe 12 and the existing pipe 10 and into the spaces between the side plates and end plates of each segment of the rehabilitation pipe 12.

In the present invention, the internal circumferential surface of the rehabilitation pipe 12 is lined using a pipe-lining material in order to rehabilitate the existing pipe 10 with even greater strength. This method is shown in FIG. 6.

Figure 7:
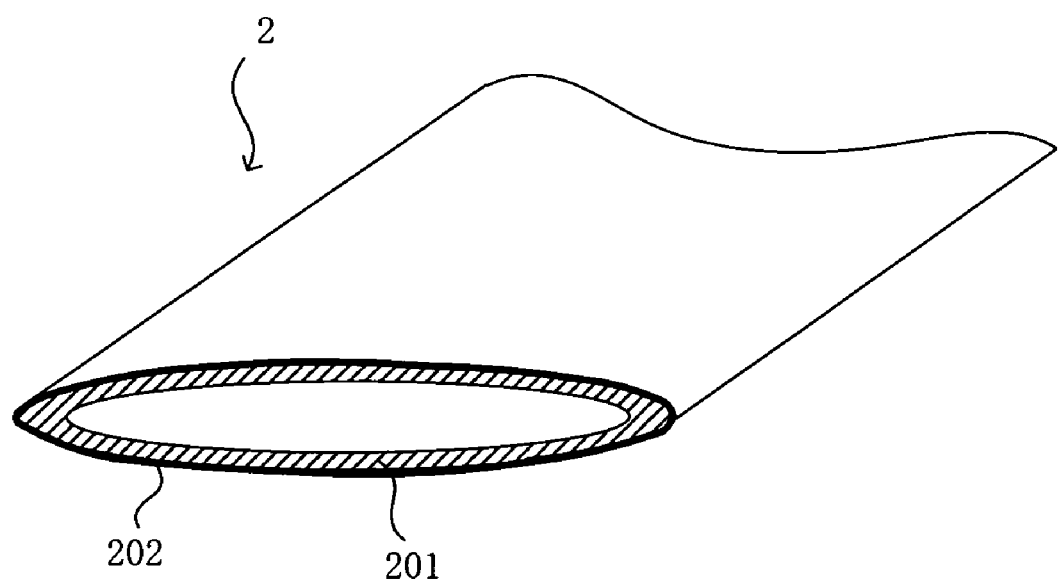
FIG. 7 is a perspective view showing the configuration of the pipe-lining material.

A pipe-lining material 2 is a soft tubular liner made of a flexible tubular resin-absorbing material 201 whose external surface (which becomes the internal surface after eversion) is covered with a soft tube 202 composed of a highly airtight plastic film of polyethylene, polypropylene, nylon, vinyl chloride, or the like, as shown in FIG. 7. The tubular resin-absorbing material 201 is composed of a matte, a woven, or a nonwoven using polyamide, polyester, polypropylene, or another plastic fiber; a matte or a woven using glass fiber; or a matte, a woven, or a nonwoven that combines the use of the above-mentioned plastic fiber and fiber glass. The tubular resin-absorbing material 201 is impregnated with unsaturated polyester resin, vinyl ester resin, epoxy resin, or another uncured liquid thermosetting resin. The tubular resin-absorbing material 201 may be impregnated with a photocurable resin together with the thermosetting resin or in place of the thermosetting resin.

Figure 6:
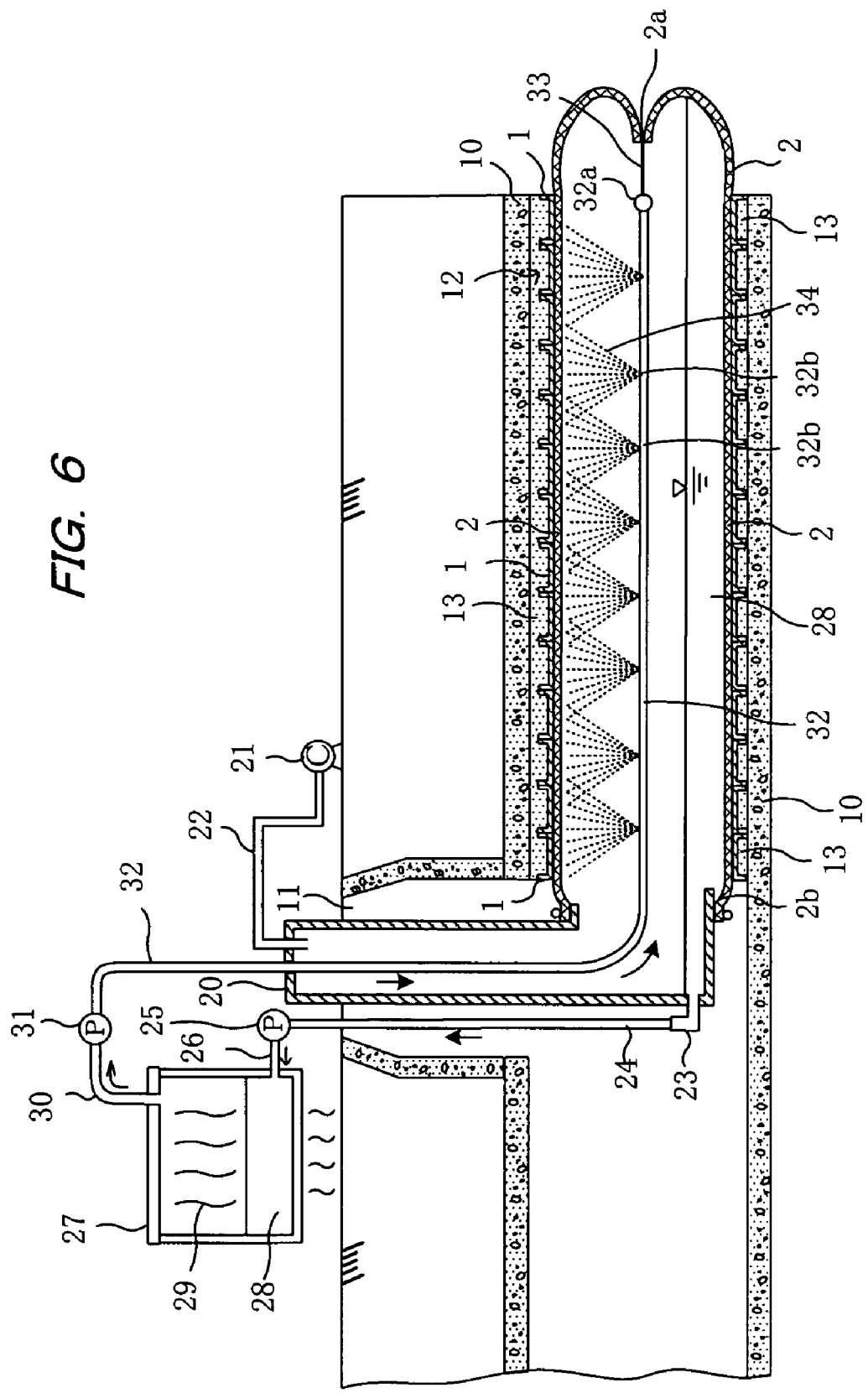
FIG. 6 is an illustrative view showing a method for constructing a rehabilitation pipe inside an existing pipe using segments and then lining the internal circumferential surface of the rehabilitation pipe with a lining material.

The distal end 2a of the pipe-lining material 2 is closed, as shown in FIG. 6, and the rear end 2b is open and is coupled in an airtight manner to an opening formed in the lower end of a pressure container 20 that is installed inside the manhole 11.

An air compressor 21 is connected to the pressure container 20 via a pipe 22. A drainage pipe 23 is provided to the lower part of the pressure container 20, and a hot water hose 24 connected to a hot water pump 25 above ground is connected to the drainage pipe 23. The hot water pump 25 is connected to the lower part of a steam tank 27 via a pipe 26, and hot water 28 that resides in the lower part of the pipe-lining material 2 during the curing process is fed to the steam tank 27. The steam tank 27 is heated by a heater (not shown), and hot water 28 is brought to a boil in the steam tank to produce steam 29. A steam pump 31 is connected to the upper part of the steam tank 27 via a pipe 30, and a steam hose 32 is connected to the steam pump 31.

The steam hose 32 is connected in an airtight manner to the pressure container 20 and inserted into the pipe-lining material 2. The distal end 32a of the steam hose is coupled to the distal end 2a of the pipe-lining material 2 by a rope 33. The steam hose 32 is inserted into the rehabilitation pipe 12 in progression with the insertion of the pipe-lining material 2. Numerous discharge ports 32b are formed in the steam hose 32 to discharge steam as a mist 34 toward the pipe-lining material 2 via the discharge ports 32b.

In such a configuration, the pipe-lining material 2 is stored inside the pressure container 20 (or fed into the pressure container 20 in an airtight manner from the exterior) and is mounted in an airtight manner to the open end in the lower part of the pressure container 20. The pipe-lining material 2 is inserted into the rehabilitation pipe 12 while being everted when compressed air is fed from the air compressor 21 into the pressure container 20.

When the pipe-lining material 2 is inserted by a predetermined length, the steam 29 from the steam tank 27 is fed to the steam hose 32 by the steam pump 31. The pipe-lining material 2 is expanded in a circular manner by the compressed air and is pressed against the internal circumferential surface of the rehabilitation pipe 12. In this state, steam is blown as a mist 34 from the discharge ports 32b of the steam hose 32 onto the pipe-lining material 2. Therefore, curing proceeds in the thermosetting resin with which the pipe-lining material 2 is impregnated. This causes the internal circumferential surface of the rehabilitation pipe 12 to be lined with the pipe-lining material 2.

The steam discharged onto the pipe-lining material 2 is collected as hot water 28 below. The hot water is returned to the steam tank 27 via the drainage pipe 23 or the like, and is reheated and fed as steam to the steam hose 32. Therefore, the lining can save energy because a hot water circulation system is formed. The resin can be uniformly cured because the steam is discharged as a mist.

The pipe-lining material 2 cured inside the rehabilitation pipe 12 is cut at the end parts 2a, 2b, thereby forming a rehabilitation pipe composed of the pipe-lining material 2 that is integrated with the rehabilitation pipe 12 composed of the segments.

In the embodiment described above, the pipe-lining material is inserted into the existing pipe by eversion, but it is also possible to insert the pipe-lining material by drawing. The thermosetting resin is cured using steam, but curing may be carried out by discharging hot water as such or a hot water mist, or by using hot water showering. In the case that the pipe-lining material 2 is cured using a hot water mist or by hot water showering, a hot water tank is used in place of the steam tank 27, and a hot water hose having numerous discharge ports is used in place of the steam hose 32. In the case that hot air is used as the heat medium for curing the resin, hot air is fed to cure the pipe-lining material. The resin-absorbing material 201 may also be impregnated with a photocurable resin, in which case UV rays or another light is radiated onto the pipe-lining material in place of the heat medium to cure the pipe-lining material.

Figure 8:
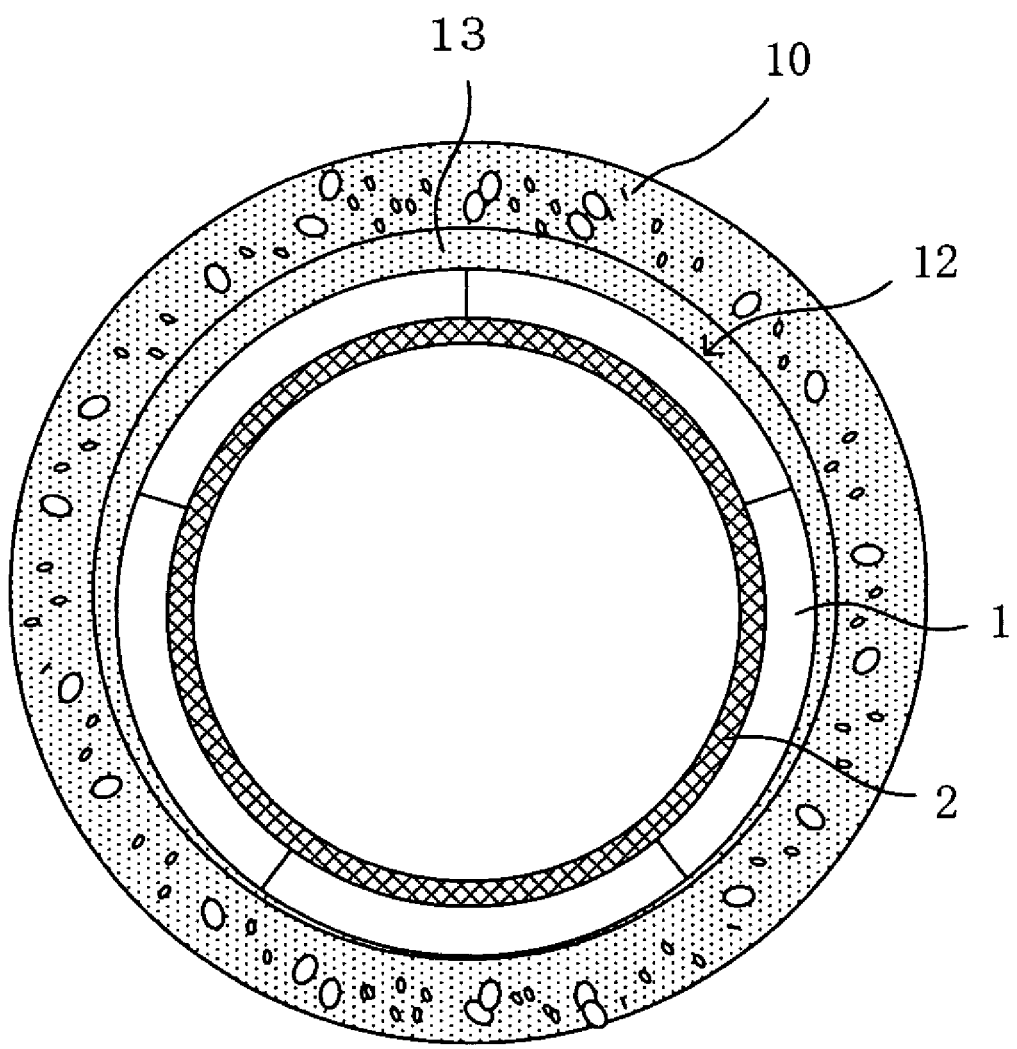
FIG. 8 is a cross-sectional view of an existing pipe rehabilitated using the method shown in FIG. 6.

Thus, in the present invention, a rehabilitation pipe having two layers of different material, i.e., a rehabilitation pipe composed of the segments 1 and the rehabilitation pipe 12 composed of the pipe-lining material 2, is laid inside the existing pipe 10, as shown in FIG. 8. Since the rehabilitation pipe 12 and the existing pipe 10 are integrated via the filling material 13, and the resin impregnated in the pipe-lining material 2 bonds the segments 1 of the rehabilitation pipe 12 together, it is possible to construct an integrally composed pipe of the existing pipe 10, the rehabilitation pipe of the segments 1 and the rehabilitation pipe of the pipe-lining material 2. This allows a self-supporting pipe to be constructed with dramatically improved strength that will incur little damage or breaking even when an earthquake occurs or another large impact is applied. Depending on the strength required as a self-supporting pipe, i.e., in the case that there is no great need for strength, the thickness of the pipe-lining material can be reduced. Therefore, the rehabilitation work using the pipe-lining material can be performed quickly and smoothly. In the case that the thickness of the pipe-lining material is to be increased, a rehabilitation pipe having low-cost segments can be constructed because the internal skeletal structure of the segments can be reduced.

The strength of the rehabilitation pipe of the segments can be increased by bonding the segments together using the resin because the resin impregnated in the tubular resin-absorbing material 201 of the pipe-lining material 2 functions as an adhesive.

Figure 9:
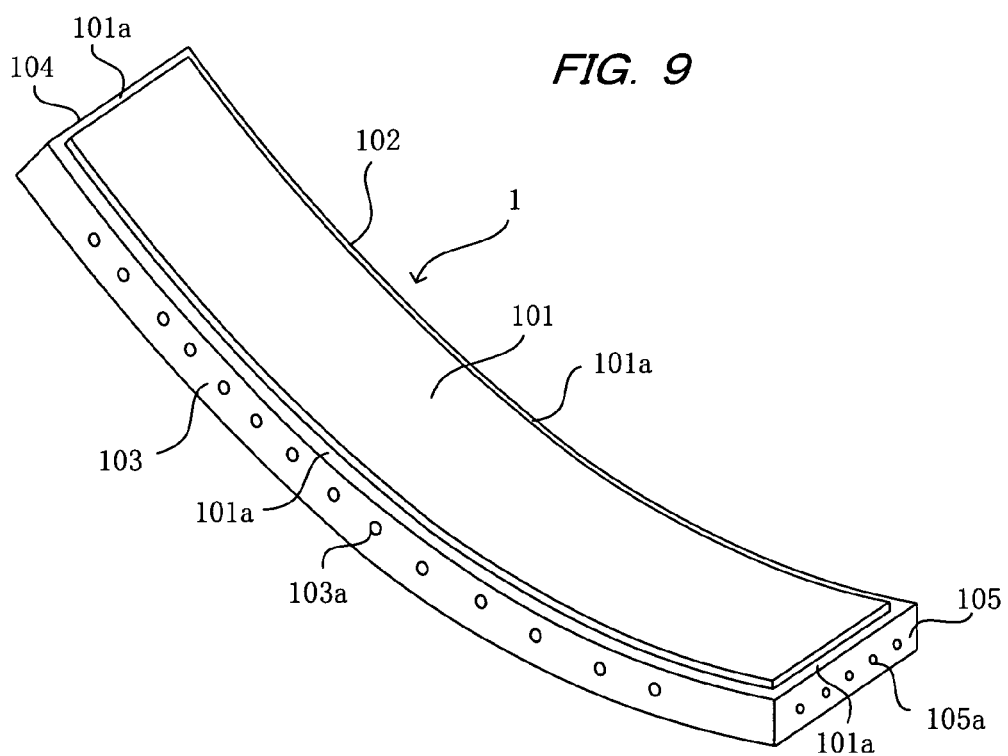
FIG. 9 is a perspective view of a segment in which concavities for resin flow have been formed in the internal circumferential surface thereof.
Figure 10:
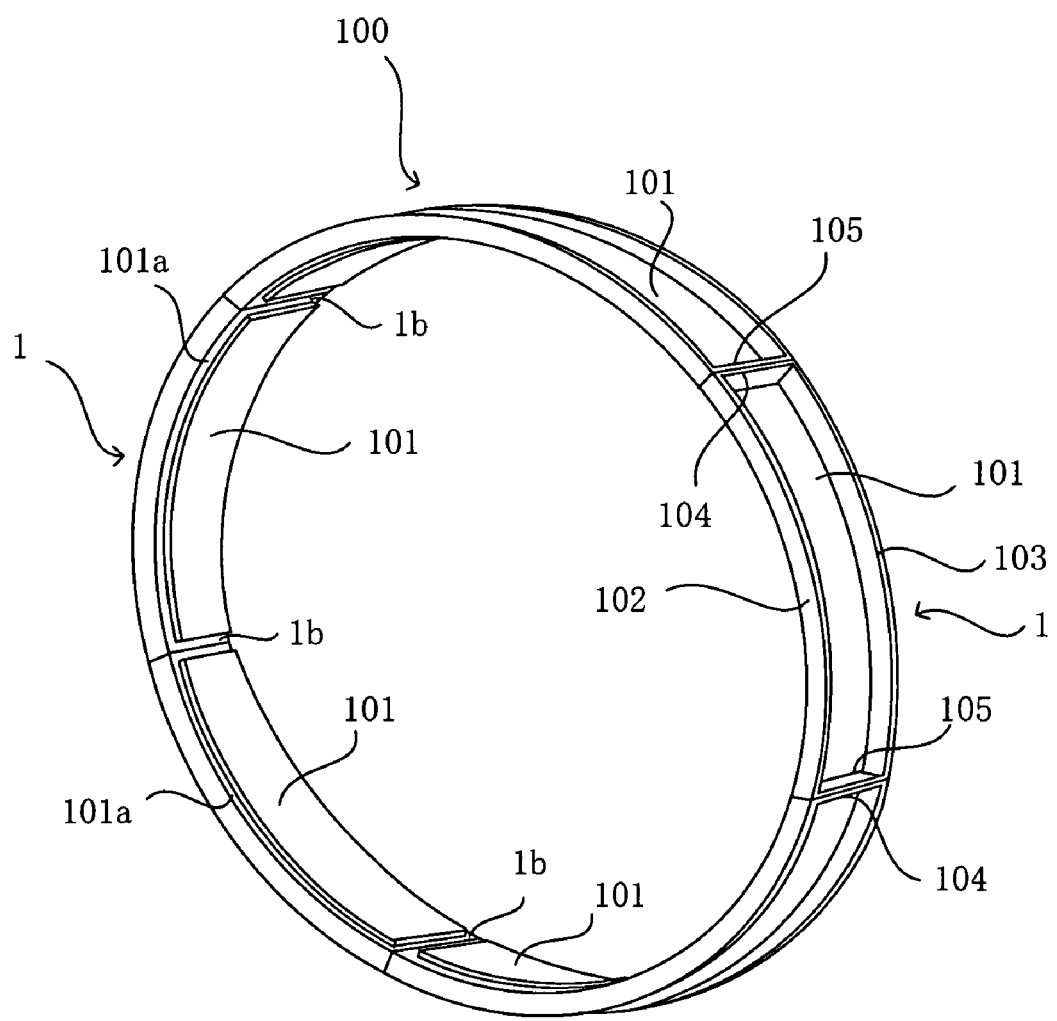
FIG. 10 is a perspective view of a pipe unit obtained by coupling segments in the circumferential direction using a segment as shown in FIG. 9.
Figure 11:
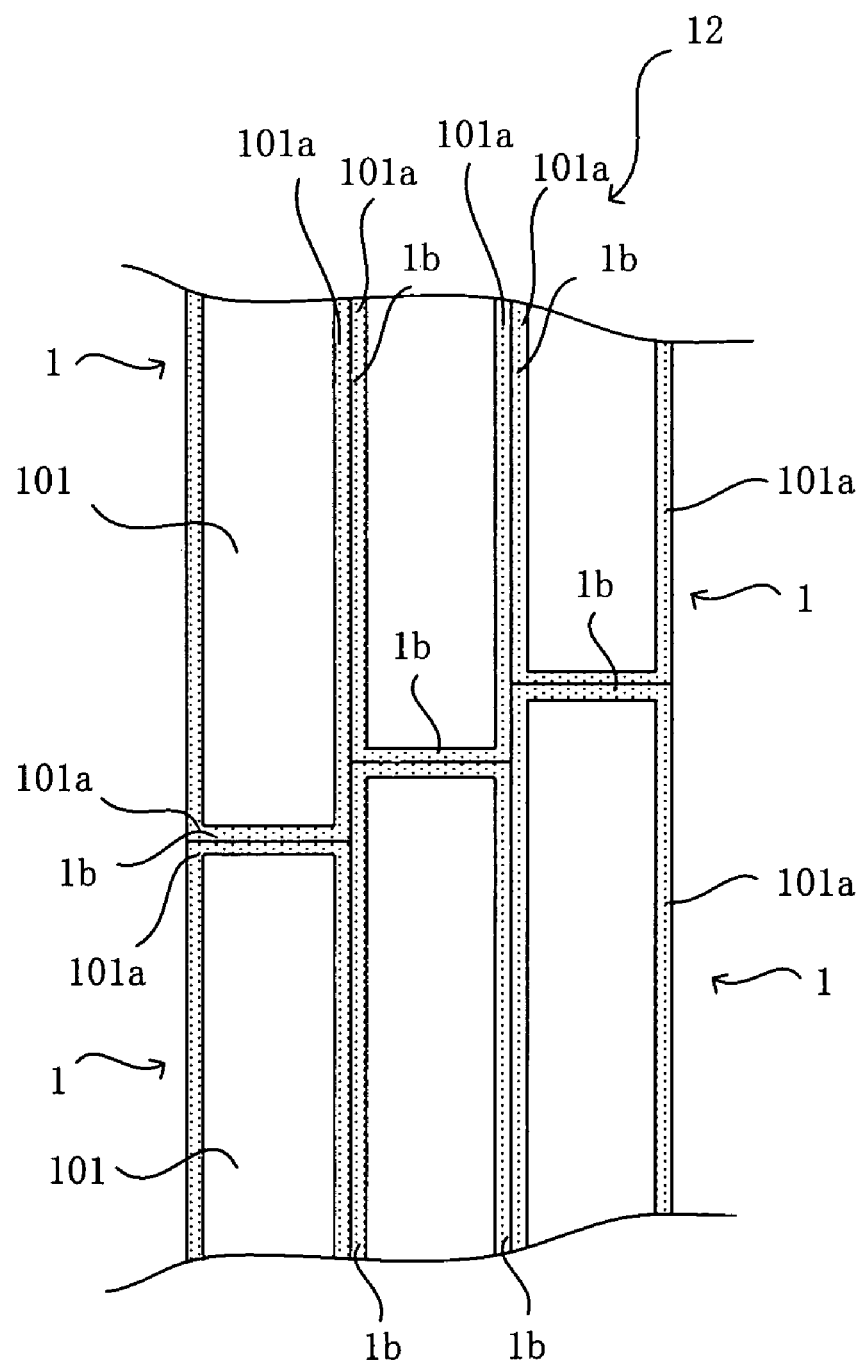
FIG. 11 is an illustrative view showing the internal circumferential surface of a rehabilitation pipe obtained by coupling segments in the circumferential and lengthwise directions of the segment using a segment as shown in FIG. 9.

For this reason, as shown in FIG. 9, the external periphery in the four directions of the internal circumferential surface of the segment 1 is lowered to form concavities (depressions) 101a that will serve as channels for the resin. The concavities 101a are not required to be formed in the four directions along the external periphery of the inner surface plate 101, and may be formed in a single direction, two directions, or three directions thereof. When concavities are formed in the internal circumferential surface of the segment in this manner, gaps 1b are formed by the concavities 101a between adjacent segments 1, 1 when the segments are coupled in the circumferential and lengthwise direction of the pipe, as shown in FIGS. 10 and 11.

Figure 12A:
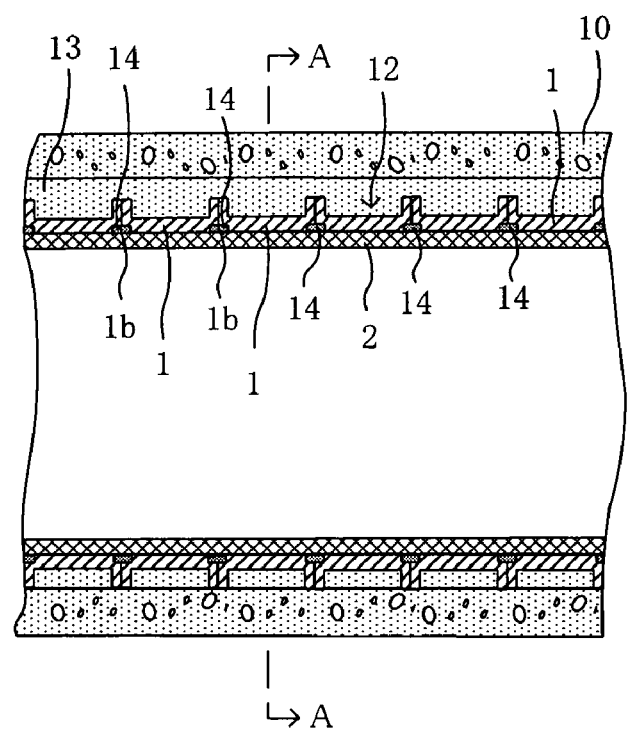
FIG. 12a is a cross-sectional view of an existing pipe when a rehabilitation pipe is assembled inside an existing pipe using a segment as shown in FIG. 9 and then lined using a lining material along the internal circumferential surface of the rehabilitation pipe.
Figure 12B:
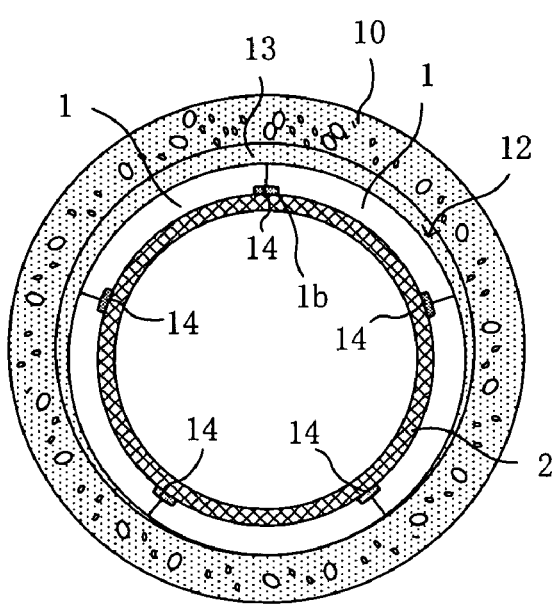

After a rehabilitation pipe has been assembled inside an existing pipe using such segments, the pipe-lining material 2 is inserted in the manner shown in FIG. 6, compressed air is fed to expand the pipe-lining material, the pipe-lining material 2 is pressed against the internal circumferential surface of the rehabilitation pipe 12 of the segments, and the liquid curable resin impregnated in the tubular resin-absorbing material 201 is allowed to flow into the gaps 1b formed by the concavities 101a of the segments 1. The resin 14 of the tubular resin-absorbing material 201 pools in the concavities 101a or the gaps 1b of the segment 1, as shown in FIGS. 12a and 12b.

In this state, the internal circumferential surface of the rehabilitation pipe 12 is lined by irradiating the pipe-lining material 2 with heat or light to cure the resin impregnated in the tubular resin-absorbing material 201. Since the resin 14 that has flowed into the concavities 101a or the gaps 1b of the segments 1 cures at the same time, adjacent segments bond together and are firmly and integrally coupled together. Therefore, it is possible to obtain a structure having strength to withstand pressure that acts internally and externally because the thickness of the rehabilitation pipe 12 is increased by lining with the pipe-lining material 2, and also because the segments constituting the rehabilitation pipe 12 are integrated by the resin.

The number of bolts 41 and nuts 42 (FIG. 3) that couple the segments in the lengthwise direction of the pipe may be reduced, or connection using nuts and bolts may be omitted in accordance with the bonding strength between the segments. It is also possible to dramatically reduce construction costs by reducing construction time. Since resin flows into the concavities 101a or the gaps 1b of the segments 1, the amount of resin to be impregnated in the tubular resin-absorbing material 201 is increased by the amount of resin that flows in the gaps and concavities.

Figure 13:
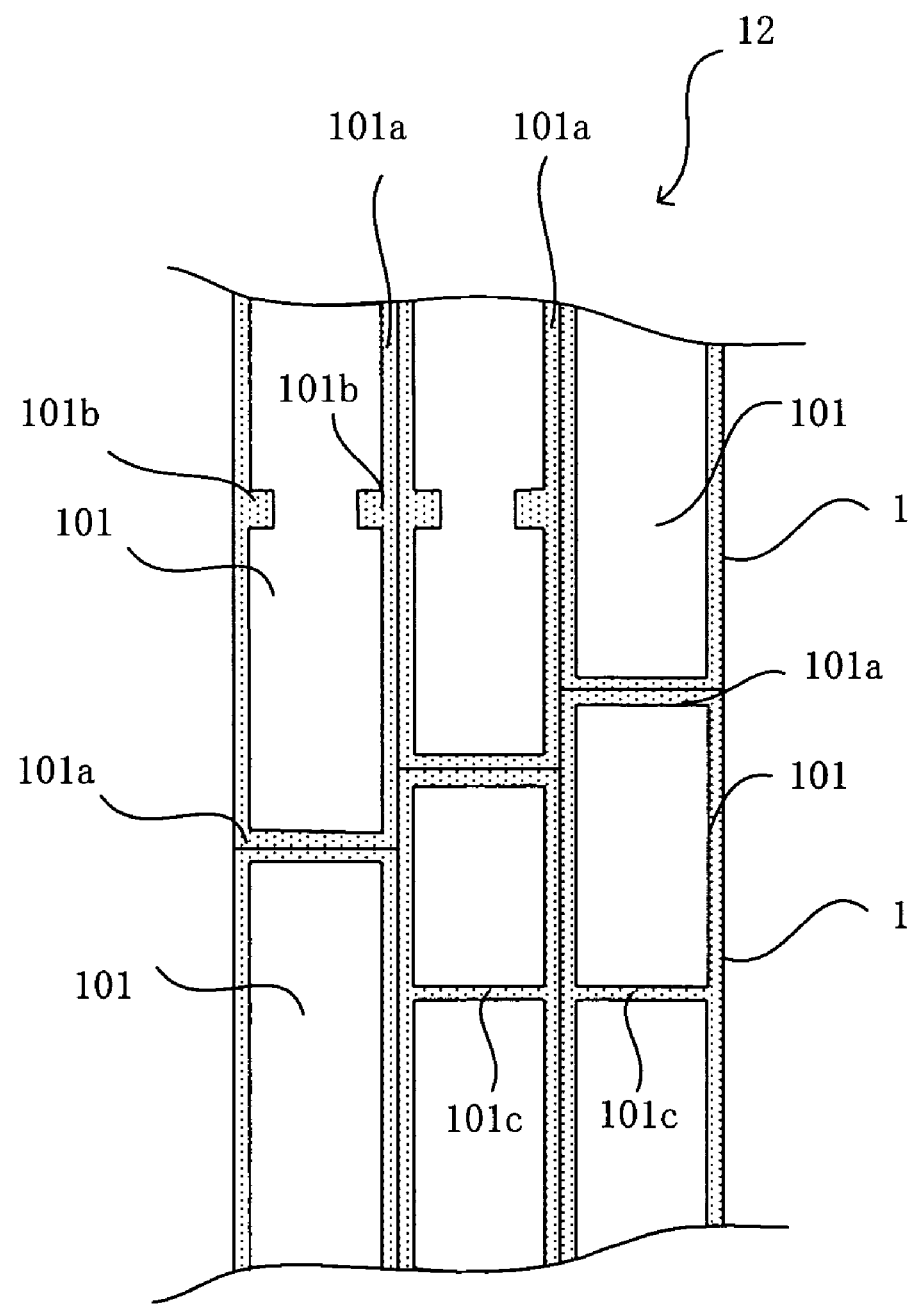
FIG. 13 is an illustrative view showing the internal circumferential surface of another segment in which concavities for resin flow have been formed in the segment.

The concavities 101a formed in the internal circumferential surface of the segments 1 are formed in the external circumferential part of the segments in four directions, but it is also possible to increase the number of gaps into which the resin used for bonding adjacent segments will flow. This will be done by forming rectangular concavities 101b in the side part, or by forming groove-shaped concavities 101c, as shown in FIG. 13. The shape and size of the concavities or the grooves are not particularly limited to those shown in the drawings, and it is possible to use any shape as long as gaps are formed for the resin to flow between adjacent segments.

Figure 14:
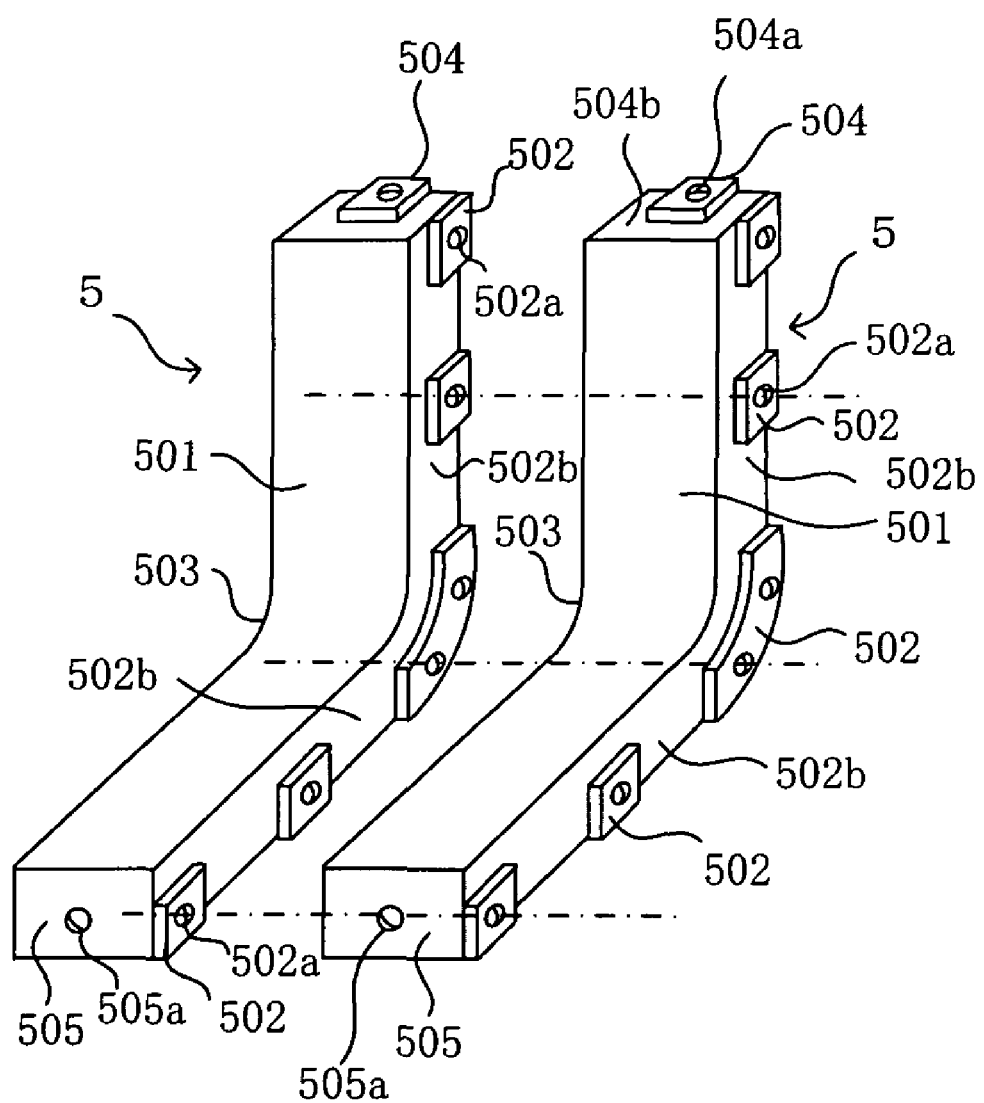
FIG. 14 is a perspective view showing another embodiment of the segment.

It is also possible to form the gaps through which the resin flows in not only in the internal circumferential surface of the segments, but also in the side plates and end plates of the segments, as shown in FIG. 14.

Figure 15:
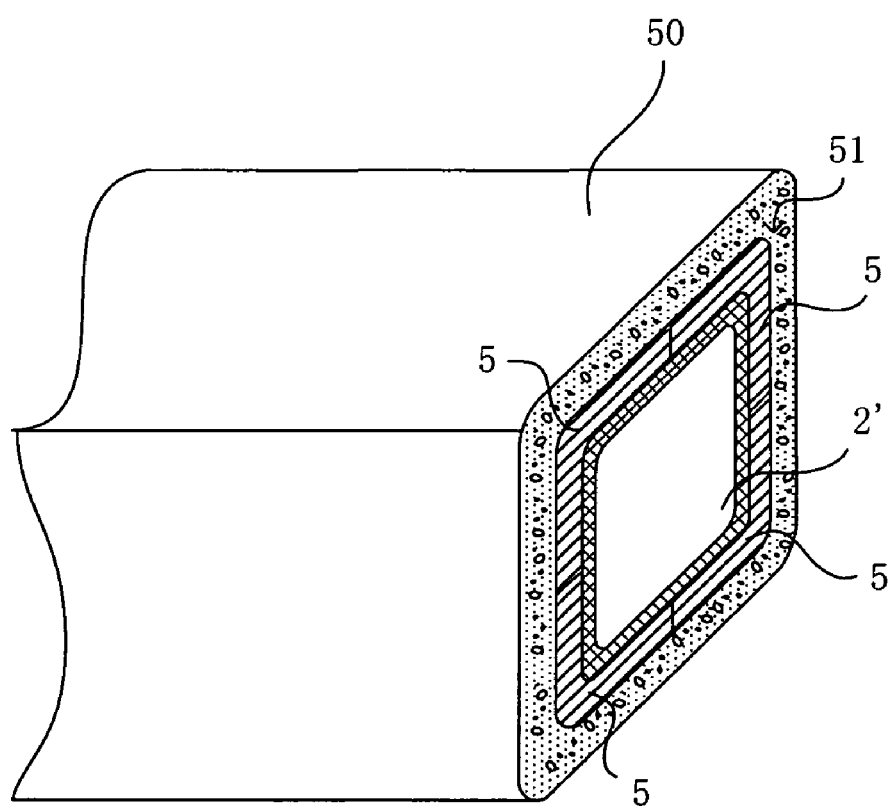
FIG. 15 is a perspective view showing a composite pipe when a rehabilitation box culvert is constructed inside an existing box culvert using a segment as shown in FIG. 14.

Segments 5 shown in FIG. 14 are used for rehabilitating an existing box culvert 50 that is rectangular in cross section, as shown in FIG. 15, and has a shape with curved right angles obtained by dividing the rectangle into four parts. The segments 5 have an inner surface plate 501, side plates 502, 503, and end plates 504, 505 that are integrally molded using plastic, and an inner plate (not shown) is provided in the same manner as in the segments 1 to form a ribbed structure. Holes 502a, 504a, 505a (the holes of the side plate 503 are not visible) for inserting bolts for coupling the segments 5 in the circumferential and lengthwise directions of the pipe are formed in the side plates 502, 503 and the end plates 504, 505.

In the segments 5, concavities 502b, 504b through which resin will flow are formed in the side plate 502 and end plate 504. The surface area occupied by the concavities 502b, 504b is no less than half of the entire surface area of the side plate 502 and the end plate 504. The side plate 503 and the end plate 505 are uniformly flat surfaces.

A rehabilitation box culvert 51 (FIG. 15) may be laid inside an existing box culvert 50 by coupling the segments 5 together using nuts, bolts, and the like in the circumferential and lengthwise direction of the pipe in the same manner as the segments 1. At this point, although not depicted in FIG. 15, grout material or another filling material is filled into the gaps between the existing box culvert 50 and the rehabilitation box culvert 51 to make the existing box culvert 50 and the rehabilitation box culvert 51 integrated.

When the segments 5 are coupled in the circumferential direction, the end plate 504 of a segment 5 is brought into contact with the end plate 505 of the other segment 5, and gaps are therefore formed by concavities 504b between the segments 5. When the segments are coupled in the lengthwise direction of the pipe, the side plate 502 of a segment 5 is brought into contact with the side plate 503 of another segment 5, and gaps are therefore formed by the concavities 502b between the segments 5.

In this state, a lining material 2' having the same configuration as the pipe-lining material 2 is inserted into the rehabilitation box culvert 51 and expanded by compressed air using the method shown in FIG. 6, the lining material 2' is pressed against the internal circumferential surface of the rehabilitation box culvert 51, and liquid curable resin impregnated in a tubular resin-absorbing material is then made to flow into the gaps formed by the concavities 502b, 504b of the segments 5. The lining material 2' is irradiated with heat or light to cure the resin impregnated therein. This causes the internal circumferential surface of the rehabilitation box culvert 51 to be lined and the resin that has flowed into the concavities 502b, 504b to be also cured. Therefore, adjacent segments are bonded together, the segments are firmly and integrally coupled together, and the same effects as those described above are obtained.

The segments are made of plastic and cannot withstand high heat. Therefore, when the pipe-lining material 2 or the lining material 2' is to be heated, a steam mist may be cooled, or hot air may be applied, or hot water may be fed from a steam hose so as to discharge a hot water mist and cure the thermosetting resin of the lining material 2, 2'. The temperature of the steam, hot water, or other heat medium may be set in accordance with the material properties of the segments, i.e., the characteristics of the plastic.

Figure 16:
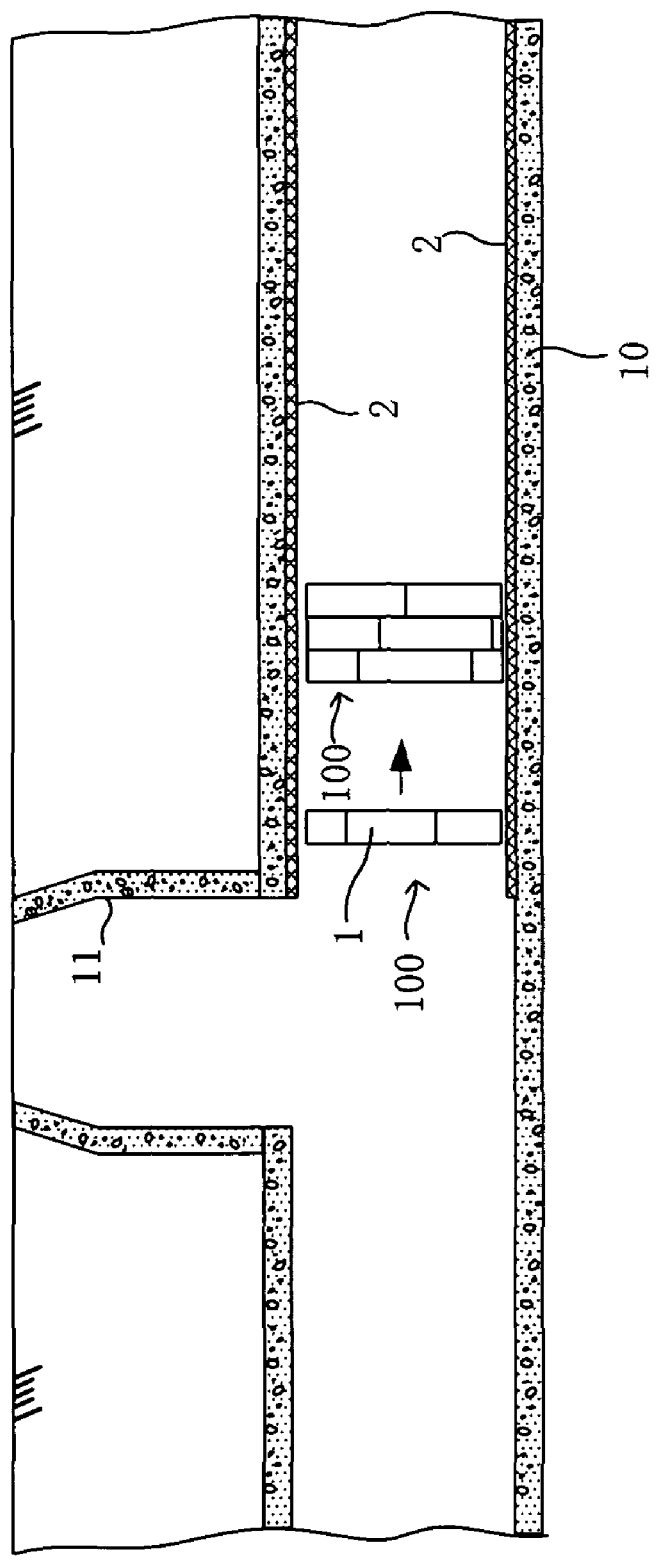
FIG. 16 is an illustrative view showing a method for coupling segments inside an existing pipe that are lined with a pipe-lining material.

In the above-described embodiments, a rehabilitation pipe comprised of segments was initially installed inside an existing pipe, and a bilayer rehabilitation pipe was constructed thereafter by lining the rehabilitation pipe with a pipe-lining material. However, it is possible to first line the internal circumferential surface of the existing pipe using a pipe-lining material, and then assemble the rehabilitation pipe using the segments inside the lined existing pipe to form a bilayer structure. This method is shown in FIG. 16.

The pipe-lining material 2 is inserted into the existing pipe 10, expanded using compressed air, and pressed against the internal circumferential surface of the existing pipe 10 using the same method as that shown in FIG. 6. In this state, resin impregnated in the tubular resin-absorbing material 201 is cured by irradiating it with heat or light, and the internal circumferential surface of the existing pipe 10 is lined by the pipe-lining material 2. This state is shown in FIG. 16.

Next, pipe units 100 obtained by coupling the segments in the circumferential direction are transported into the lined existing pipe 10 from the manhole 11, and a rehabilitation pipe 12 composed of the segments 1 is constructed by coupling the pipe units 100 in the lengthwise direction of the pipe. The method for assembling the rehabilitation pipe 12 is the same at shown in FIGS. 2 and 3.

Figure 17:
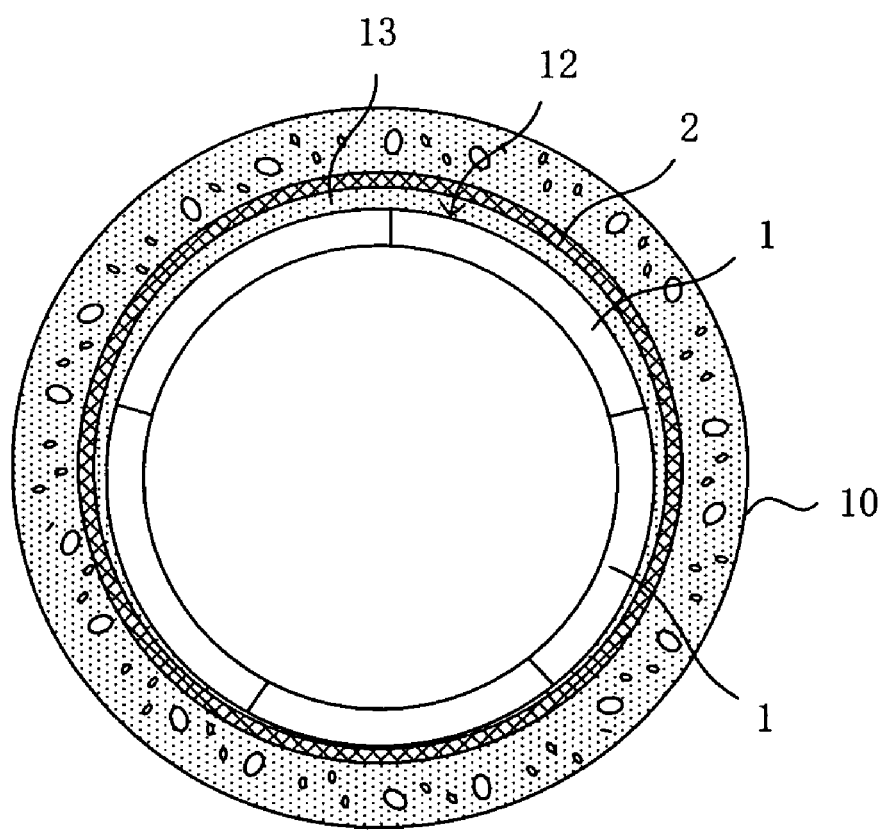
FIG. 17 is a cross-sectional view showing an existing pipe rehabilitated using the method shown in FIG. 16.

When the rehabilitation pipe 12 is assembled, a filling material composed of a grout material is injected into the gaps 13 between the rehabilitation pipe 12 and the lining surface of the existing pipe 10 and into the spaces between the side plates and end plates of the segments of the rehabilitation pipe 12, as shown in FIG. 17, whereby the lined existing pipe 10 and the rehabilitation pipe 12 are firmly coupled together and the two pipes are integrated.

As described above, a rehabilitation pipe composed of a pipe-lining material and a rehabilitation pipe composed of segments are installed inside the existing pipe 10. Thus, a composite pipe in which the existing pipe and the bilayer rehabilitation pipe are integrated can be constructed in the same manner as mentioned above and a strong self-supporting pipe is constructed.

What is claimed is:

1. An existing-pipe rehabilitation method for constructing a rehabilitation pipe inside an existing pipe to rehabilitate the existing pipe, comprising:

constructing, inside an existing pipe, a rehabilitation pipe obtained by coupling segments in the circumferential direction and the lengthwise direction of the existing pipe so that the rehabilitation pipe has a constant outer diameter; and inserting a lining material impregnated with a liquid curable resin into the rehabilitation pipe thus constructed, and curing the curable resin to line the internal circumferential surface of the rehabilitation pipe with the lining material so that an inner diameter of the rehabilitation pipe lined with the lining material is smaller than an inner diameter of the existing pipe.

2. An existing-pipe rehabilitation method according to claim 1, wherein the segments are provided with concavities for producing gaps between adjacent coupled segments, the adjacent segments being bonded together by the curable resin of the lining material that has flowed into the gaps.

3. An existing-pipe rehabilitation method according to claim 1, wherein a filling material is injected into gaps formed between the existing pipe and the rehabilitation pipe constructed of the segments to couple the existing pipe and the rehabilitation pipe together.

4. An existing-pipe rehabilitation method according to claim 1, wherein the temperature for curing the lining material is set in accordance with the material properties of the segments.

5. An existing-pipe rehabilitation method according to claim 1, wherein the curable resin impregnated in the lining material is a resin cured by heat or light.

6. An existing-pipe rehabilitation method according to claim 1, wherein the lining material is inserted into the rehabilitation pipe by eversion or by drawing.

7. An existing-pipe rehabilitation method for constructing a rehabilitation pipe inside an existing pipe to rehabilitate the existing pipe, comprising:
   inserting a lining material impregnated with a liquid curable resin into an existing pipe, and curing the curable resin to line the internal circumferential surface of the existing pipe with the lining material; and
   constructing, inside the existing pipe lined with the lining material, a rehabilitation pipe obtained by coupling segments in the circumferential direction and the lengthwise direction of the existing pipe.

8. An existing-pipe rehabilitation method according to claim 7, wherein a filling material is injected into gaps formed between the lined existing pipe and the rehabilitation pipe to couple both of the pipes together.

9. An existing-pipe rehabilitation method according to claim 7, wherein the curable resin impregnated in the lining material is a resin cured by heat or light.

10. An existing-pipe rehabilitation method according to claim 7, wherein the lining material is inserted into the existing pipe by eversion or by drawing.

11. A rehabilitation pipe segment used in the existing-pipe rehabilitation method of claim 1, wherein concavities for producing gaps between adjacent segments are formed in the segments, and the adjacent segments are bonded together by the curable resin of the lining material that has flowed into the gaps.

12. An existing-pipe rehabilitation method according to claim 1, wherein the rehabilitation pipe is constructed inside of the existing pipe so that the coupled segments engage with but do not rupture an inner wall of the existing pipe.

13. An existing-pipe rehabilitation method for constructing a rehabilitation pipe inside an existing pipe to rehabilitate the existing pipe, comprising:
   constructing, inside an existing pipe, a rehabilitation pipe obtained by coupling segments in the circumferential direction and the lengthwise direction of the existing pipe, the segments being provided with concavities producing gaps between adjacent coupled segments; and
   inserting a lining material impregnated with a liquid curable resin into the rehabilitation pipe thus constructed so that the liquid curable resin flows into the gaps between the adjacent coupled segments, and curing the liquid curable resin to line the internal circumferential surface of the rehabilitation pipe with the lining material while the adjacent segments are bonded together by the curable resin that has flowed into the gaps between the adjacent coupled segments.

14. An existing-pipe rehabilitation method according to claim 13, wherein a filling material is injected into gaps formed between the existing pipe and the rehabilitation pipe constructed of the segments to couple the existing pipe and the rehabilitation pipe together.

15. An existing-pipe rehabilitation method according to claim 13, wherein the temperature for curing the lining material is set in accordance with the material properties of the segments.

16. An existing-pipe rehabilitation method according to claim 13, wherein the curable resin impregnated in the lining material is a resin cured by heat or light.

17. An existing-pipe rehabilitation method according to claim 13, wherein the lining material is inserted into the rehabilitation pipe by eversion or by drawing.

18. An existing-pipe rehabilitation method according to claim 13, wherein the rehabilitation pipe is constructed inside of the existing pipe so that the coupled segments engage with but do not rupture an inner wall of the existing pipe.

* * * * *